United States Patent [19]

Kumpar

[11] Patent Number: 4,549,872
[45] Date of Patent: Oct. 29, 1985

[54] HOMOKINETIC COUPLING

[75] Inventor: Zvonimir Z. Kumpar, Zeist, Netherlands

[73] Assignee: SKF Industrial Trading & Development Company B.V., Nieuwegein, Netherlands

[21] Appl. No.: 585,019

[22] Filed: Mar. 5, 1984

Related U.S. Application Data

[63] Continuation of Ser. No. 374,293, May 3, 1982, abandoned.

[30] Foreign Application Priority Data

May 14, 1981 [NL] Netherlands .......................... 8102379

[51] Int. Cl.[4] .............................................. F16D 3/22
[52] U.S. Cl. ...................................... 464/141; 464/906
[58] Field of Search ...................... 403/57; 464/81, 82, 464/139, 141, 150, 906

[56] References Cited

U.S. PATENT DOCUMENTS

| | | | |
|---|---|---|---|
| 1,622,425 | 3/1927 | Dwyer | 464/141 |
| 2,653,456 | 9/1953 | Heym | 464/141 |
| 3,187,520 | 6/1965 | Rzeppa | 464/82 X |
| 4,358,283 | 11/1982 | Kumpar | 464/906 X |

FOREIGN PATENT DOCUMENTS

| | | | |
|---|---|---|---|
| 849501 | 9/1952 | Fed. Rep. of Germany | 464/82 |
| 1500768 | 2/1978 | United Kingdom . | |
| 197709 | 9/1977 | U.S.S.R. | 464/141 |

Primary Examiner—Stuart S. Levy
Assistant Examiner—Daniel P. Stodola
Attorney, Agent, or Firm—J. David Dainow

[57] ABSTRACT

A homokinetic coupling which has a housing or outer ring with a cavity limited by a spherical surface and open toward the outside at least one edge. An inner ring, having an outer spherical surface with axially extending grooves is placed within this cavity. A set of balls flattened at one edge is accommodated at that edge in the grooves. The bottoms of the grooves form a rolling surface along which the balls are capable of moving by the flattened edge. At the other edge the balls are accommodated, rotating by the spherical edge in a recess forming a part of the housing. The housing has a plurality of rotating ball-shaped elements with a recess in each element, in which recess the spherical edge of the respective ball is partially accommodated.

7 Claims, 3 Drawing Figures

HOMOKINETIC COUPLING

This application is a continuation, of application Ser. No. 374,293, filed May 3, 1982, now abandoned.

BACKGROUND OF THE INVENTION

The invention concerns a homokinetic coupling comprising a housing or outer ring having a cavity defining a spherical surface which is accessible at least at one edge and an inner ring having an outer surface formed by a spherical surface and adapted for positioning within the cavity. The spherical surface of the inner ring is fashioned with a set of axially extending grooves. The bottoms of the grooves provide a rolling surface for the flattened ends of a set of balls. The opposite ends of the balls are accommodated in a rotating relationship in recesses formed in the inner surface of the outer ring. Such a homokinetic coupling is disclosed in Dutch patent application 7902092.

In the known homokinetic coupling the recesses of the housing for accomodating the balls are axially extending grooves fashioned in the spherical surface of the cavity of said housing. These grooves as well as the grooves in the inner ring, must deepen as they extend toward the open edge of the cavity so that the optimal transfer of torque at various angles between the axes of symmetry of the inner and outer rings may be attained. Resilient retaining rings are attached to the inner ring and the housing about the open edge of the cavity to prevent the balls from disengaging from the grooves. Obviously, the specific shape of the grooves increases the manufacturing costs of the coupling.

The manufacturing costs of this homokinetic coupling are comparatively high, owing to the fact that the grooves must have a specific shape, in particular, must be formed becoming deeper.

The object of the invention is to procure a homokinetic coupling of the type mentioned which may be manufactured more cheaply.

British patent specification 1088615 discloses a homokinetic coupling with rolling members each having a recess. The rolling members are flattened at two diametrically opposing edges. A recess is formed in one flattened edge while the other flattened ball edge rests against the inner edge of a cylindrical surface of the cavity of the outer ring. Projecting cams which are mounted in the bottom of axially extended grooves of the inner ring are accommodated in the recesses.

SUMMARY OF THE INVENTION

The improved coupling of the present invention comprises a housing having a plurality of rotating ball-shaped elements. A recess, which partially accommodates the spherical surface of a ball, is formed in each element. An inner ring, having grooves of constant depth formed in its outer spherically shaped surface is adapted for positioning within the outer housing.

In this arrangement, grooves need to be formed only in the inner ring, and no separate retaining means is necessary to prevent the balls from falling out of the housing. The unique configuration of the ball-shaped elements allows them to self-adjust for the optimal transfer of torque at various angles between the axes of symmetry of the inner and outer rings.

Each ball-shaped element is preferably placed rotating in a cavity fixed in relation to the housing, where the grooves in the inner ring have a constant depth. The recess in the ball-shaped elements is advantageously tapered where the taper radially extends in the direction of the outer housing circumference.

For facilitating assembly of the coupling pursuant to the invention, the ball-shaped elements are accomodated in round openings formed by two half round openings adjoining one another, which openings are respectively formed in the housing and in a retaining part of the housing. The retaining part is connected with the housing by a ring which covers the elements and balls.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
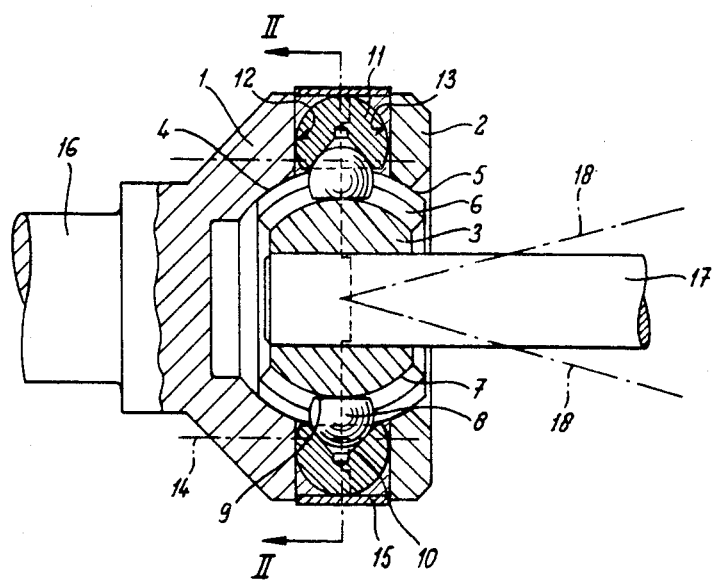
FIG. 1 represents a homokinetic coupling pursuant to the invention in axial cross-section.
Figure 2:
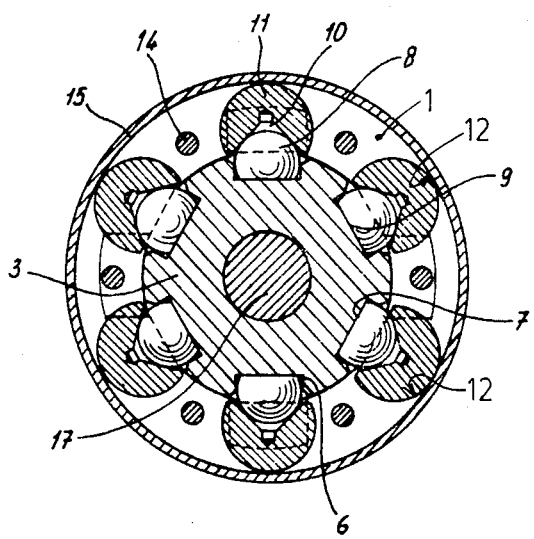
FIG. 2 is a cross-section along line II—II of FIG. 1.
Figure 3:
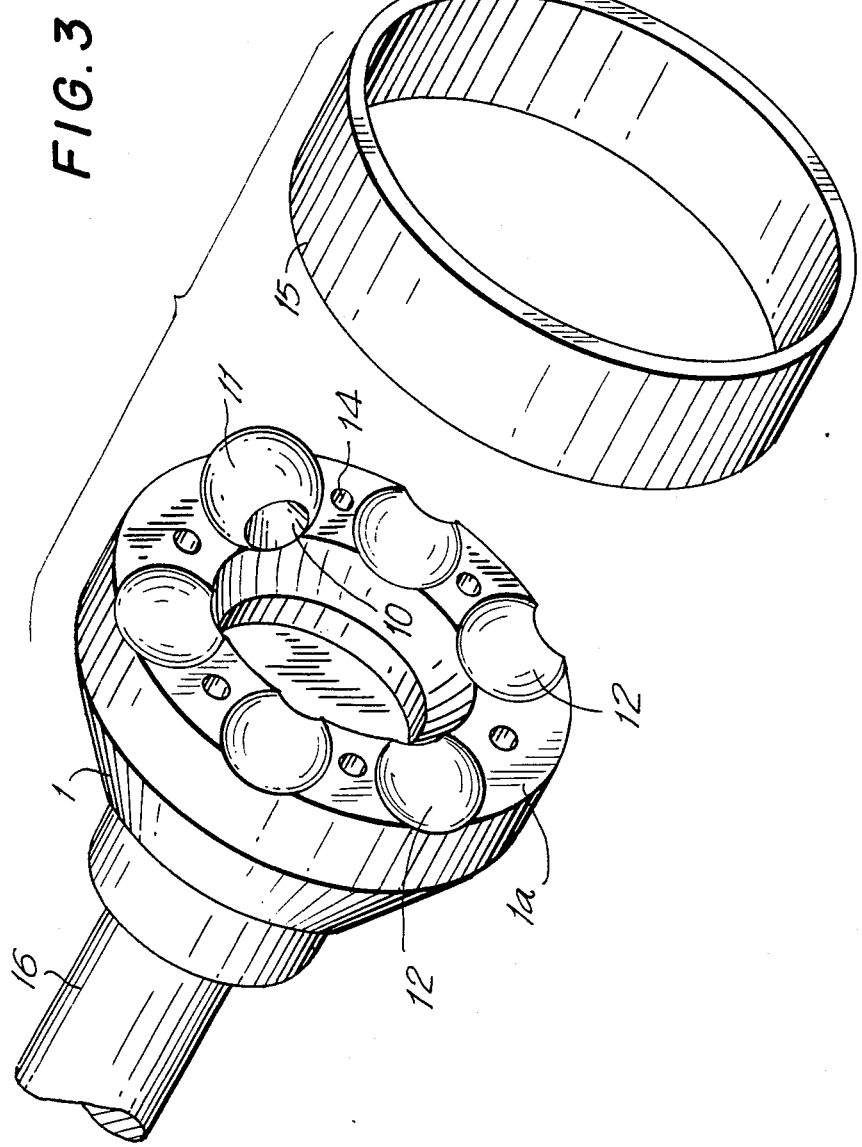
FIG. 3 is a perspective view of the housing.

As shown in the drawing, the coupling comprises a housing or outer ring 1 with a retaining part 2, and an inner ring 3 placed within the housing 1,2. The housing 1,2 encloses a cavity having a spherical inner or concave surface 4. Inner ring 3 has a spherical outer or convex surface 5 fashioned with axially extending constant depth grooves 6. The bottom surface 7 of the grooves 6 is a cylindrical surface.

A set of balls 8 having a flattened edge 9 is partially accomodated in the grooves 6, so that these balls 8 are in line contact with the rolling or bearing surfaces formed by the bottoms of the grooves 6. The spherical surface of the balls 8 are partially accomodated in tapered recesses 10 which are formed in the ball-shaped elements 11.

The ball-shaped elements 11 lie in round openings consisting of two halves. A first half 12 of the openings is formed in the housing 1, while the second half 13 is formed in the retaining part 2. The retaining part 2 is connected with the housing 1 by means of connecting elements 14, where a ring 15 covering the openings 12,13 is mounted.

The housing 1,2 is provided with a shaft 16 attached to inner ring 3 is a shaft 17 which is capable of setting movement of ±40° with respect to shaft 16 as indicated by the broken lines 18, which indicate the outermost positions of the center line of the shaft 17 in the plane of drawing. At the same time, the ball-shaped elements 11 always adjust themselves such that the torque of, for example, the shaft 17 is always optimally transferred to the shaft 16.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

I claim:

1. A homokinetic coupling comprising a housing having a central axis and a cavity defining an inner spherical surface, a plurality of circumferentially arranged concave spherical openings disposed in said inner spherical surface, an inner ring having an outer spherical surface disposed in said cavity, a plurality of axially extending grooves of substantially constant depth circumferentially arranged in said outer spherical surface, each of said openings being situated radially outward of one of said grooves, a plurality of balls, each ball having a flattened edge with an opposite spherical outside surface, said balls being disposed with their flattened edge in the bottom of each of said grooves, each of the groove bottoms is correspondingly flattened to provide a bearing surface for said flattened edge, a plurality of rotatable ball-shaped elements, each disposed in one of said openings, each of said ball-shaped elements having a recess in which is situated part of said spherical outside surface of one of said balls.

2. The homokinetic coupling according to claim 1 wherein each ball-shaped element is adapted for rotation in a respective one of said openings fixed in relation to the housing.

3. The homokinetic coupling according to claim 1 wherein said housing further includes an annular retaining part disposed adjacent an axially directed end thereof and means for securing said retaining part to said housing.

4. The homokinetic coupling according to claim 3 wherein each of said openings is defined partially by said housing and partially by said retaining part.

5. The homokinetic coupling according to claim 3 wherein each of said openings is defined half by said housing and half by said retaining part.

6. The homokinetic coupling according to claim 3 wherein the housing and the retaining part are connected by a ring covering the openings and said ball-shaped elements.

7. The homokinetic coupling according to claim 1 wherein each of said recesses is tapered, becoming smaller in the inward direction.

* * * * *

UNITED STATES PATENT AND TRADEMARK OFFICE
CERTIFICATE OF CORRECTION

PATENT NO. : 4,549,872

DATED : October 29, 1985

INVENTOR(S) : Zvonimir Z. Kumpar

It is certified that error appears in the above-identified patent and that said Letters Patent is hereby corrected as shown below:

Column 1, line 25, omit ",".

Column 2, line 52, after "16" insert --.--.

Column 2, line 52, omit "attached" and insert --Attached--.

Signed and Sealed this

Twenty-eighth Day of October, 1986

[SEAL]

*Attest:*

DONALD J. QUIGG

*Attesting Officer*    *Commissioner of Patents and Trademarks*